United States Patent
Pan et al.

(10) Patent No.: US 12,184,559 B2
(45) Date of Patent: Dec. 31, 2024

(54) REDUCING PLACEMENT CONFLICTS BETWEEN CONCURRENT VIRTUAL MACHINE ALLOCATIONS

(71) Applicant: Microsoft Technology Licensing, LLC, Redmond, WA (US)

(72) Inventors: Abhisek Pan, Bellevue, WA (US); Eric Zhao Hao, Seattle, WA (US); Esaias Englebertus Greeff, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/026,295

(22) PCT Filed: Sep. 14, 2021

(86) PCT No.: PCT/US2021/050297
§ 371 (c)(1),
(2) Date: Mar. 14, 2023

(87) PCT Pub. No.: WO2022/056476
PCT Pub. Date: Mar. 17, 2022

(65) Prior Publication Data
US 2023/0362103 A1    Nov. 9, 2023

(30) Foreign Application Priority Data
Sep. 14, 2020   (NL) ..................... 2026462

(51) Int. Cl.
*H04L 47/74* (2022.01)
*G06F 9/455* (2018.01)
*H04L 41/0893* (2022.01)

(52) U.S. Cl.
CPC ........ *H04L 47/745* (2013.01); *G06F 9/45558* (2013.01); *H04L 41/0893* (2013.01);
(Continued)

(58) Field of Classification Search
None
See application file for complete search history.

(56) References Cited

U.S. PATENT DOCUMENTS 9,137,096 B1 * 9/2015 Yehuda ................... H04L 63/20
9,659,080 B1 * 5/2017 Drobychev ......... H04L 67/1095
(Continued)

FOREIGN PATENT DOCUMENTS

EP    4090107 A1 *  11/2022  ........... H04L 5/0042

OTHER PUBLICATIONS

"Search Report Issued in Netherlands Patent Application No. N2026462", Mailed Date: Jun. 10, 2021, 12 Pages.
(Continued)

*Primary Examiner* — Joshua Joo
(74) *Attorney, Agent, or Firm* — Ray Quinney & Nebeker; James Bullough

(57) ABSTRACT

The present disclosure relates to systems, methods, and computer readable media for reducing placement conflicts between allocation agents tasked with allocating computing resources on a computing zone. For example, systems disclosed herein may identify placement conflicts between multiple allocation agents processing incoming placement requests on a computing zone. The systems disclosed herein may further modify a placement policy based on the number of placement conflicts by reducing one or more restrictions on rules for allocating computing resources. For example, the systems disclosed herein may enlarge a placement zone of server nodes when allocating computing resources to prevent or otherwise reduce conflicts between multiple allocation agents implementing the same placement policies. By reducing allocation restrictions and enlarging a placement zone, the systems described herein may significantly
(Continued)

reduce placement conflicts while still optimizing placement of services on nodes of a cloud computing system.

20 Claims, 9 Drawing Sheets

(52) U.S. Cl.
CPC ............. *G06F 2009/4557* (2013.01); *G06F 2009/45595* (2013.01)

(56) References Cited

U.S. PATENT DOCUMENTS

| | | | | |
|---|---|---|---|---|
| 2006/0291393 | A1* | 12/2006 | Teague | H04W 72/23 370/335 |
| 2013/0007272 | A1* | 1/2013 | Breitgand | G06F 9/5077 709/224 |
| 2016/0043968 | A1 | 2/2016 | Vattakkandy et al. | |
| 2016/0283270 | A1* | 9/2016 | Amaral | G06F 9/5027 |
| 2018/0123830 | A1* | 5/2018 | Gaddehosur | G06F 9/45537 |
| 2018/0295034 | A1 | 10/2018 | Feller et al. | |
| 2019/0235909 | A1* | 8/2019 | Jin | H04L 41/00 |
| 2020/0045724 | A1* | 2/2020 | Lu | H04W 72/21 |
| 2021/0051711 | A1* | 2/2021 | Abedini | H04W 16/10 |
| 2021/0096902 | A1* | 4/2021 | Xu | G06F 9/5022 |
| 2021/0240537 | A1* | 8/2021 | Chen | G06F 9/5044 |
| 2022/0147350 | A1* | 5/2022 | Lochhead | H04L 41/0893 |
| 2022/0342693 | A1* | 10/2022 | Mentz | G06F 9/4401 |

OTHER PUBLICATIONS

"International Search Report and Written Opinion Issued in PCT Application No. PCT/US21/050297", Mailed Date: Oct. 25, 2021, 12 Pages.

Schwarzkopf, et al., "Omega: Flexible, Scalable Schedulers for Large Compute Clusters", In Proceedings of the 8th ACM European Conference on Computer Systems, Apr. 15, 2013, pp. 351-364.

* cited by examiner

REDUCING PLACEMENT CONFLICTS BETWEEN CONCURRENT VIRTUAL MACHINE ALLOCATIONS

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing adequate cloud-based resources to customers has become increasingly difficult. For example, as demand for cloud computing resources continues to grow, an increasing number of customers and tenants are requesting deployment of cloud computing resources at higher rates. With increased demand for computing resources, however, conventional systems for allocating computing resources to accommodate resource requests suffer from a number of problems and drawbacks.

For example, conventional allocation systems are often limited by an ability of the allocation systems to process a high volume of incoming requests. For instance, allocation agents are typically employed on server devices (e.g., server nodes) having finite computing capabilities. Accordingly, while conventional allocation systems can typically allocate hundreds of discrete resources every minute, allocation agents receiving thousands of resource requests within a short period of time may cause delay in allocating resources to accommodate the sudden spike in received resource requests. Moreover, while processing resources continue to improve, demand for cloud computing resources continues to increase, and modern server devices are unable to provide sufficient throughput to accommodate high volume periods of deployment requests.

To accommodate higher volumes of service requests, some conventional systems employ multiple server devices that provide multiple allocation agents capable of operating in parallel. For example, conventional systems may concurrently process placement requests received in a way that enables a greater number of resource requests to be placed on available computing resources. These parallel allocation agents, however, often experience placement conflicts as a result of one or more allocation agents attempting to allocate overlapping computing resources for two or more resource requests. These placement conflicts can cause significant delay and often results in placement requests being processed multiple times prior to successfully placing resources on a cloud computing system.

These and other problems exist in connection with allocating computing resources responsive to receiving a high volume of placement requests.

DETAILED DESCRIPTION

Figure 1:
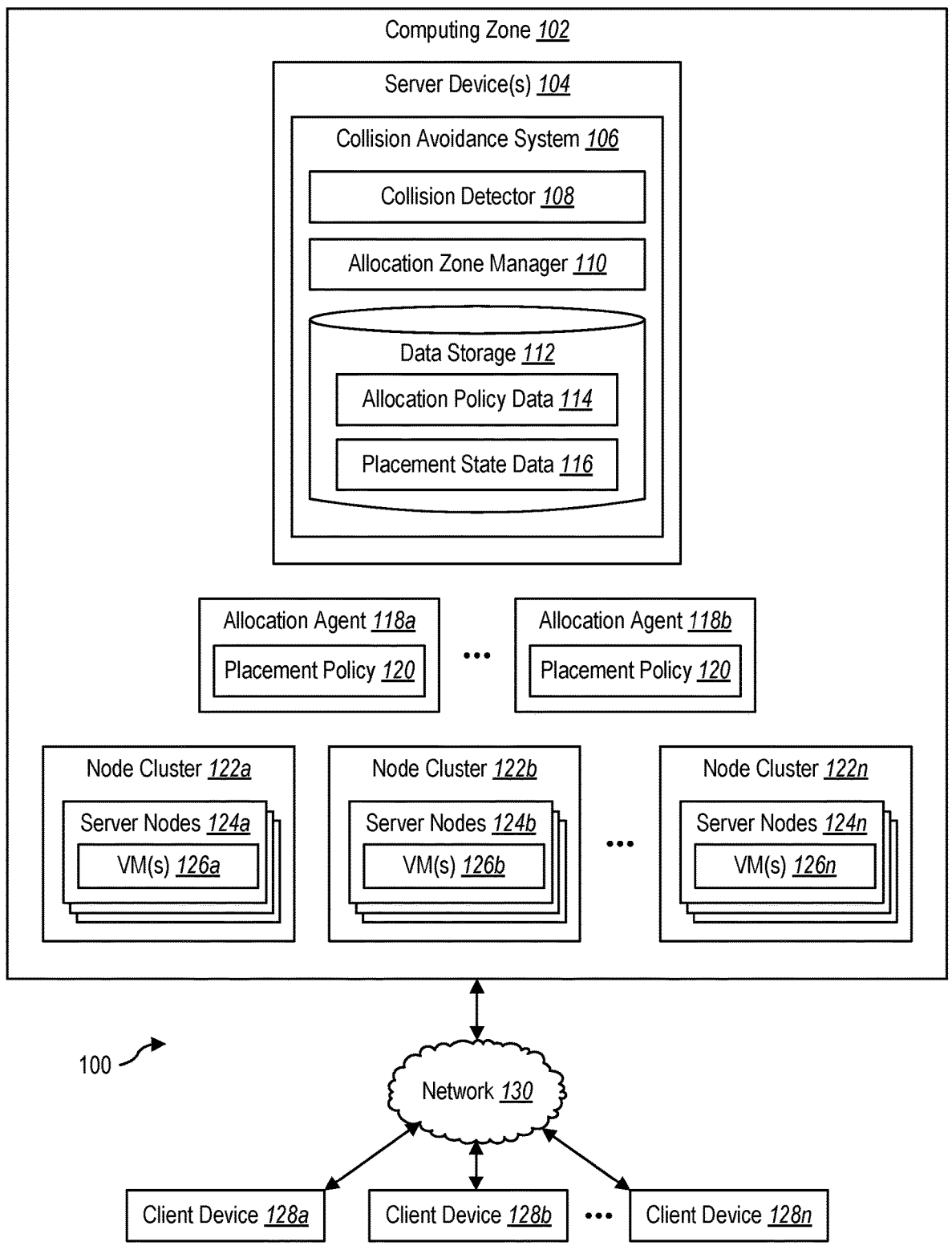
FIG. 1 illustrates an example environment of a computing zone including a collision avoidance system in accordance with one or more embodiments.

The present disclosure is generally related to systems and methods for reducing conflicts in placement (e.g., allocation, deployment) of services (e.g., virtual machines) on server nodes of a cloud computing system. In particular, the present disclosure relates to a collision avoidance system that prevents or otherwise reduces collisions caused as a result of allocation agents operating in parallel and attempting to allocate overlapping computing resources to accommodate a high volume of placement requests (e.g., container or virtual machine placement requests). The collision avoidance system can reduce placement conflicts by maintaining and dynamically updating a placement policy that causes allocation agents to allocate computing resources in order to maximize or otherwise optimize utilization of computing resources on a particular computing zone.

As will be discussed in further detail herein, the collision avoidance system can reduce placement conflicts in a variety of ways. For example, the collision avoidance system can implement a placement policy that causes allocation agents to pseudo-randomly allocate computing resources in response to incoming placement requests. In one or more embodiments, the collision avoidance system reduces placement conflicts by modifying the policy in a way that reduces a probability that allocations implemented by a first allocation agent will collide with concurrent allocations implemented by a second allocation agent. In addition, the collision avoidance system can selectively modify how and where certain types of placement requests will be allocated to further reduce placement conflicts between allocation agents.

By way of example, and as will be discussed in further detail below, the collision avoidance system can maintain a placement store including a record of deployed services (e.g., containers, virtual machines) on a plurality of computing nodes of a computing zone where the computing zone has a plurality of agent allocators implemented thereon. The collision avoidance system may determine that a number of placement conflicts between the plurality of agent allocators with respect to incoming placement requests exceeds a threshold number of placement conflicts for a recent period of time. Based on detecting the threshold number of placement conflicts, the collision avoidance system can modify the placement policy by decreasing one or more restrictions from the placement policy associated with allocating resources on the plurality of computing nodes of the computing zone. Additional information in connection with one or more examples will be discussed herein.

The present disclosure includes a number of practical applications that provide benefits and/or solve problems associated with reducing or otherwise preventing occurrence of placement conflicts as a result of multiple allocation agents operating in parallel with one another on a particular computing zone. Some examples of these applications and benefits are discussed in further detail below.

For example, in one or more embodiments, the collision avoidance system partially randomizes allocation of computing resources in accordance with a placement policy. In particular, where placement policies having identical sets of allocation rules would likely result in concurrently operating allocation agents conflicting with one another, one or more embodiments described herein involve randomly allocating resources from a set of computing nodes using a partially random placement policy. For example, the collision avoidance system reduces placement conflicts by selecting a set of eligible computing nodes that is sufficiently large to reduce the probability of two or more concurrently operating allocation agents allocating overlapping sets of resources.

In addition to partially randomizing placement of services, the collision avoidance system can additionally dynamically modify the placement policy based on observed conflicts for a computing zone. In particular, where a high volume of placement requests start causing placement conflicts between two or more allocation agents, the collision avoidance system can relax or otherwise reduce one or more allocation rules to increase a number of eligible computing nodes capable of accommodating allocation of computing resources. This temporary expansion of eligible computing nodes allows the collision avoidance system to reduce placement conflicts while continuing to enable the allocation agents to pursue worthwhile allocation goals (e.g., reducing fragmentation, optimizing resources) for a computing zone.

Moreover, in one or more embodiments, the collision avoidance system enables selective randomization of resource allocation for specific types of resources. For example, where the collision avoidance system observes that only certain types of virtual machines are associated with an observed uptick in placement conflicts, the collision avoidance system may selectively update the placement policy to affect a first type of virtual machines without modifying the placement policy to affect other types of virtual machines. In this way, the collision avoidance can reduce placement conflicts while allowing the allocation agents to continue to optimize allocation of cloud computing resources as much as possible.

As illustrated in the foregoing discussion, the present disclosure utilizes a variety of terms to describe features and advantages of the systems described herein. Additional detail is now provided regarding the meaning of some example terms.

For example, as used herein, a "cloud computing system" refers to a network of connected computing devices that provide various services to customer devices (e.g., client devices, network devices). For instance, as mentioned above, a distributed computing system can include a collection of physical server devices (e.g., server nodes) organized in a hierarchical structure including clusters, computing zones, virtual local area networks (VLANs), racks, fault domains, etc. A cloud computing system may refer to a private or public cloud-computing system.

As used herein, a "computing zone" or "zone" refers to any grouping or set of multiple computing nodes on a cloud computing system. For example, a computing zone may refer to a node cluster, a set of node clusters, a datacenter, multiple datacenters (e.g., a region of multiple datacenters), a server rack, a row or server racks, a group of nodes that are powered by a common power source, or other hierarchical structure in which network devices are physically or virtually grouped together. In one or more embodiments, the computing zone refers to a cloud computing system. Alternatively, a computing zone may refer to any subset of network devices of the cloud computing system. A computing zone may include any number of nodes thereon. By way of example and not limitation, in one or more embodiments, a computing zone may include anywhere between 1000 nodes to 250,000 nodes.

In one or more embodiments described herein, a computing zone may include multiple allocation agents. As used herein, an "allocation agent" refers to an application, routine, executable instructions, or other software and/or hardware mechanism employed by a server device to allocate resources on server nodes of a computing zone. For example, an allocation agent may refer to a service on a cloud computing system deployed on a server device that is configured to execute instructions for allocating computing resources in response to received placement requests. In one or more embodiments, an allocation agent allocates resources for deployment of virtual machines, computing containers, or any other type of service that may be deployed on server nodes of a cloud computing system. Indeed, while one or more embodiments described herein refers specifically to an allocation agent placing virtual machines on nodes of a computing zone, similar features may also apply to placing any type of service, such as computing containers or other cloud-based services. As will be discussed in more detail herein, a computing zone may include multiple allocation agents operating in parallel to allocate resources in accordance with one or more placement policies.

As used herein, a "placement request" refers to any request for deployment of a service on a cloud computing system. For example, a placement request may refer to a request to deploy or launch a virtual machine in accordance with virtual machine specifications. A placement request may include an identification of a customer, indicated specifications for a virtual machine (or other resource), such as a size of the virtual machine (e.g., number of compute cores), a type of virtual machine, or any other information that may be used by an allocation agent to determine a location (e.g., a server node, a set of core(s) on a server node) on which to deploy the virtual machine(s). A placement request may include a request to deploy a single computing resource instance (e.g., a single virtual machine). A placement request may alternatively include a request to deploy multiple service instances (e.g., multiple virtual machines) for one or more customers.

As used herein, a "placement conflict" or "placement collision" refers to a conflict between two or more allocation agents in attempting to allocate computing resources of a computing zone. In particular, in one or more embodiments described herein, a placement conflict refers to an instance in which a first allocation agent attempts to allocate computing resources for a first virtual machine at the same location (e.g., using the same set of computing resources) as a second virtual machine (or other type of service). For example, a placement conflict may exist where a first allocation agent allocates a first set of resources for a first service (e.g., a first virtual machine) and a second allocation agent attempts to allocate the same set of resources (or some overlapping set of resources) for a second service (e.g., a second virtual machine). Indeed, a placement conflict may refer to any instance in which an allocation agent is unable to place a virtual machine or other service on a computing resource due to previous action by another allocation agent.

As used herein, a "placement policy" refers to any instructions or rules associated with allocating resources on a computing zone. For example, a placement policy may include a hierarchy of rules that an allocation agent follows in allocating resources for placement of a service on computing resources of the computing zone. The placement policy may include information such as a number of compute cores, a type or generation of server node(s), a maximum fragmentation of a candidate compute node, or other feature(s) of the hardware on which an allocation is to take place for an associated placement request. A placement policy may include goals associated with a desired state of the computing zone, such as a desired fragmentation of compute nodes, a target or minimum number of healthy empty nodes having no virtual machines deployed thereon, or other preferences associated with the computing zone. In one or more embodiments described herein, a placement policy includes a listing of rules that govern placement of virtual machines (and other services) on the computing zone. For example, in one or more implementations, a placement policy includes a listing of rules in order of importance.

As used herein, a "placement," "service placement," or "deployment" may refer interchangeably to one or more associated services and allocations provided by a cloud computing system via a computing zone. For example, a placement may refer to a deployment of one or more service instances (e.g., virtual machines, containers) on one or more server nodes that are capable of providing computing resources in accordance with specifications of a placement request(s). A placement may refer to one or multiple services provided based on a single placement request. In one or more implementations, a placement refers to one or more service instances provided via a server node.

As used herein, a "core," "compute core," or "node core" may refer interchangeably to a computing resource or unit of computing resources provided via a computing node (e.g., a server node) of a cloud computing system. A compute core may refer to a virtual core that makes use of the same processor without interfering with other virtual cores operating in conjunction with the processor. Alternatively, a compute core may refer to a physical core having a physical separation from other compute cores. Compute cores implemented on one or across multiple server nodes may refer to a variety of different cores having different sizes and capabilities. A server node may include one or multiple compute cores implemented thereon. Furthermore, a set of multiple cores may be allocated for hosting one or multiple virtual machines or other cloud-based services.

Additional detail will now be provided regarding a collision avoidance system in relation to illustrative figures portraying example implementations. For example, FIG. 1 illustrates an example environment 100 including a computing zone 102. The computing zone 102 may include any number of devices. For example, in one or more embodiments, the computing zone 102 refers to a cloud computing system or portion of a cloud computing system having any number of networked devices. As shown in FIG. 1, the computing zone 102 includes a server device(s) 104 having a collision avoidance system 106 implemented thereon.

As shown in FIG. 1, the collision avoidance system 106 includes a collision detector 108, an allocation zone manager 110, and a data storage 112. The data storage 112 may include placement policy data 114 and placement state data 116. As will be discussed in further detail below, the collision avoidance system 106 performs features and functionality related to maintaining a placement store, identifying placement conflicts, and modifying a placement policy to be implemented by allocation agents in accordance with one or more embodiments described herein. Additional detail in connection with each of the components 108-116 of the collision avoidance system 106 will be described in further detail below.

As shown in FIG. 1, the computing zone 102 includes a plurality of allocation agents 118a-b. In particular, the example computing zone 102 shown in FIG. 1 includes a first allocation agent 118a and a second allocation agent 118b. The computing zone 102 may include any number of allocation agents in communication with (or incorporated within) the collision avoidance system 106. In one or more embodiments, the allocation agents 118a-b are implemented on a single server device. Alternatively, in one or more implementations, the environment 100 includes one or multiple agents implemented across multiple server devices. As noted above, the allocation agents 118a-b may include applications, routines, software, and/or hardware implemented on one or more server devices configured to allocate computing resources of the computing zone 102 to enable deployment of virtual machines (or other services) on the allocated resources.

In one or more embodiments, the allocation agents 118a-b may include a placement policy 120 thereon including rules and instructions for allocating computing resources on the computing zone 102. As will be discussed in further detail below, the placement policies 120 may include updated or modified placement policies based on allocation or deployment goals for the computing zone 102 in addition to a determined number of placement conflicts occurring between the allocation agents 118a-b (e.g., as a result of a high number of incoming placement requests). Additional information in connection with allocating resources and placing virtual machines will be discussed below.

As shown in FIG. 1, the computing zone 102 may further include a plurality of node clusters 122a-n. The node clusters 122a-n may be grouped by geographic location (e.g., a region of node clusters). The node clusters 122a-n may be implemented across multiple geographic regions (e.g., at different datacenters and/or on different server racks). It is noted that while one or more embodiments described herein relate specifically to groupings of server nodes within respective node clusters, other grouping of devices may similarly be used in allocating resources and implementing placement policies in accordance with one or more embodiments described herein.

Each of the node clusters 122a-n may include a variety of server nodes 124a-n having a number and variety of compute cores. As shown in FIG. 1, the server nodes 124a-n may include virtual machines 126a-n implemented thereon. To illustrate, a first node cluster 122a may include a first set of server nodes 124a having a first set of virtual machine(s) 126a. In particular, the first set of server nodes 124a may have compute cores capable of hosting virtual machine(s) 126a for customers of a cloud computing system. Each of the additional node clusters 122b-n having server nodes 124b-n and virtual machines 126b-n thereon may have similar features and functionality as the first node cluster 122a, first set of server nodes 124a, and associated virtual machine(s) 126a.

The virtual machine(s) 126a-n may occupy a portion of computing resources (e.g., compute cores) of the server nodes 124a-n at varying levels of fragmentation. In particular, while not shown in FIG. 1, the server nodes 124a-n may include a combination of occupied nodes, empty nodes, and fragmented nodes.

As used herein, an occupied node may refer to a server node in which each of the compute cores are occupied by a virtual machine or other cloud-based service (e.g., such that no compute cores on the server node is available for new allocations of cloud-based resources thereon). An empty node may refer to a server node in which no virtual machines are deployed thereon and for which no compute cores have been allocated for placement of virtual machines or other cloud-based service. An empty node may refer to a server node that is available for deployment of a wide variety of virtual machines thereon or may serve as a recovery node in the event that another server node having virtual machines thereon goes down, thus contributing to greater overall health of the associated node cluster. As used herein, a fragmented node may refer a server node in which one or more compute cores are occupied by a virtual machine or other cloud-based service while one or more compute cores are available for allocation. A fragmented node may have an associated level of fragmentation based on a ratio of empty to occupied cores (or a number of empty cores available for allocation).

As shown in FIG. 1, the environment 100 includes a plurality of client devices 128a-n in communication with the computing zone 102 (e.g., in communication with different server nodes 124a-n) via a network 130. The client devices 128a-n may refer to various types of computing devices including, by way of example, mobile devices, desktop computers, server devices, or other types of computing devices. The network 130 may include one or multiple networks that use one or more communication platforms or technologies for transmitting data. For example, the network 130 may include the Internet or other data link that enables transport of electronic data between respective client devices 128a-n and devices of the computing zone 102. In one or more embodiments described herein, the client devices 128a-n may provide placement requests to the allocation agents 118a-b requesting allocation of resources and/or placement of virtual machines 126a-n on the node clusters 122a-n. Further, while one or more embodiments described herein involve client devices 128a-n providing placement requests, other types of clients (e.g., internal cloud clients) may act as a source for placement requests.

In one or more embodiments, the collision avoidance system 106 and allocation agents 118a-b cooperatively cause computing resources of the node clusters 122a-n to be allocated responsive to incoming placement requests. For example, the client devices 128a-n may provide placement requests including requests for deployment of virtual machines, containers, or other cloud computing resources on available resources of the node clusters 122a-n. As indicated above, the placement requests may indicate a specific type of family of virtual machine(s) as well as an indicated number of instances of the virtual machines to be deployed on the computing zone 102. In one or more embodiments, placement requests are provided to one of the allocation agents 118a-b to determine a location for deployment of the requested resource. In one or more embodiments, the placement request(s) is provided to one of the respective allocation agents 118a-b via a load balancer or other mechanism for routing the placement request(s) to whichever allocation agent is available to receive the request.

The allocation agents 118a-n may determine placement of the requested service(s) in accordance with a placement policy 120 implemented thereon. As noted above, the placement policy 120 may include a set of instructions and/or rules that affect placement of the service(s) on computing resources of the node clusters 122a-n. The placement policy 120 may include any number of rules to optimize placement of services on the computing resources in an effort to maximize utilization of computing resources and reduce fragmentation of selective server nodes and/or node clusters as a whole.

As an example, in one or more embodiments, the placement policy 120 includes rules that prioritize placement of services on server nodes based on fragmentation of a node cluster and/or server nodes on the node cluster. For instance, in response to receipt of a placement request, a first allocation agent 118a may identify a first node cluster 122a based on overall fragmentation of the first node cluster 122a relative to additional node clusters. Within the first node cluster 122a, the first allocation agent 118a may further selectively identify one or more server nodes (e.g., fragmented server nodes) having a sufficient number of compute cores capable of hosting a virtual machine indicted by the placement request.

In one or more embodiments, the placement policy 120 includes a series of multiple rules that indicate criteria of server nodes on which the allocation agent should place a virtual machine. The allocation agent may cycle through each of the rules until finding an optimal placement of the virtual machine on a specific node cluster and/or server node. Where the allocation agent does not necessarily identify the best possible placement (e.g., in accordance with each of the placement rules), the allocation agent may identify the next best or acceptable placement of the virtual machine on whatever computing resources as indicated by the placement rules.

As noted above, in one or more embodiments, the placement rules may be overly specific and cause the allocation agents 118a-b to attempt placement of virtual machines on the same available set of computing resources in accordance with the same set of placement rules from the same placement policy 120. Thus, in one or more embodiments, the allocation agent performs a semi-random placement of virtual machines (and other services) in accordance with one or more embodiments described herein. For instance, rather than identifying a specific server, the allocation agent may apply the placement rules of the placement policy 120 to identify a placement zone having multiple possible server nodes that fit (or mostly fit) the criteria indicated by the placement rules. The placement zone may represent a subset of clusters or a subset of server nodes from a larger collection of capable nodes for hosting the virtual machine(s). Upon identifying the placement zone, the allocation agent(s) may randomly allocate computing resources for placement of a virtual machine responsive to a placement request.

While randomizing placement of resources can significantly reduce placement conflicts between the allocation agents 118a-b, the allocation agents 118a-b may nonetheless attempt to allocate the same or overlapping computing resources for placement of two or more services. In particular, where a volume of incoming placement requests are particularly high, the allocation agents 118a-b may begin experiencing a significant number of placement conflicts that cause the allocation agents to reprocess incoming placement requests, which can cause a slowdown of resource deployment on the computing zone 102.

As noted above, the collision avoidance system 106 can implement features and functionality described herein to enable the allocation agents 118a-b to experience fewer placement conflicts between one another. For example, as shown in FIG. 1, the collision avoidance system 106 includes a collision detector 108. The collision detector 108 can detect collisions between the allocation agents 118a-b within a predetermined period of time. For example, in one or more embodiments, the collision detector 108 monitors instances of collision to determine whether placement conflicts are occurring at an increased rate. More specifically, in one or more implementations, the collision detector 108 determines whether a number of placement conflicts within some predetermined period of time is greater than or equal to a threshold number of placement conflicts. This may involve determining whether a number of placement conflicts exceeds a predetermined number and/or percentage of conflicts (e.g., relative to a number of incoming placement requests over the predetermined period).

The collision detector 108 can detect the placement conflicts in a number of ways. For instance, in one or more embodiments, the collision detector 108 queries a placement store (e.g., the placement state data 116) to determine a current state of computing resources for an attempted placement by one of the allocation agents 118a-b. Where the placement store indicates that the computing resource(s) are already in use by another allocation, the collision detector 108 may determine that a conflict exists and provide an indication of the conflict to the allocation agent.

In one or more embodiments, an allocation agent provides an indication of an identified set of computing resources (e.g., an identified set of compute cores and/or an identified server node(s)) to enable the collision detector 108 to locally determine whether a placement conflict exists. For example, the collision detector 108, upon receiving the identification of the computing resources, may compare the identified computing resources with information from a placement store to determine whether one or more allocation agents 118a-b have previously allocated the same set of computing resources for placement of another service. In one or more embodiments, the collision detector 108 provides an indication of the placement conflict to the allocation agent(s) 118a-b.

The collision detector 108 may track these conflicts to determine a number of conflicts over a predetermined period of time. For example, the collision detector 108 may maintain a running total of detected conflicts over a 1-2 minute period of time (or any other interval of time) to determine if placement conflicts are happening with increased frequency. As noted above, the collision detector 108 can determine whether the tracked number of placement conflicts exceeds a threshold number or percentage of placement conflicts for the predetermined period of time, which may be used to determine whether adjustments need to be made in how computing resources are allocated in response to incoming placement requests.

As further shown in FIG. 1, the collision avoidance system 106 includes an allocation zone manager 110. As noted above, the allocation agents 118a-b may perform partially random placement of virtual machines in an attempt to reduce placement conflicts with one another. In one or more embodiments described herein, the allocation zone manager 110 may manage the level of randomness with which the virtual machines are placed on corresponding resources of the computing zone 102.

For example, in one or more embodiments, the allocation zone manager 110 identifies a set of candidate server nodes, which may include a subset of server nodes within the computing zone 102. The candidate nodes may serve as a set of target nodes on which the allocation agents 118a-b can allocate computing resources in response to incoming placement requests. For example, in one or more embodiments, the allocation agents 118a-b cause virtual machines to be randomly placed on server nodes based on the set of candidate server nodes identified by the allocation zone manager 110.

In one or more embodiments, the allocation zone manager 110 modifies the placement zone based on the identified number of placement conflicts. For example, in one or more embodiments, the allocation zone manager 110 enlarges the placement zone to include a greater number of server nodes based on a determination that the number of identified placement conflicts (e.g., within the predetermined period of time) exceeds a threshold number or percentage of placement conflicts. In one or more embodiments, the allocation zone manager 110 may further enlarge the placement zone based on a determination that the number of placement conflicts continues to exceed a threshold number of placement conflicts. Alternatively, in one or more embodiments, the allocation zone manager 110 can decrease or narrow the placement zone to a more targeted set of candidate server nodes based on determining that the number of identified placement conflicts has decreased by some threshold amount.

Thus, the allocation zone manager 110 can modify a level of randomness associated with allocation of computing resources and placing virtual machines responsive to incoming placement requests. In particular, the allocation zone manager 110 can increase or decrease a size of a placement zone (e.g., increase or decrease a number of candidate server nodes) based on an identified number of placement conflicts experienced by the allocation agents 118a-b and cause virtual machines to be placed randomly on one or more of the server nodes from the placement zone.

It will be understood that the collision detector 108 and the allocation zone manager 110 can perform acts associated with identifying placement conflicts and modifying the placement zone in a variety of ways. Additional detail in connection with each of these features and functionality of the collision avoidance system 106 will be discussed in further detail and by way of example in connection with example configurations and implementations illustrated in FIGS. 2-5B.

As mentioned above, and as further shown in FIG. 1, the collision avoidance system 106 includes a data storage 112 having placement policy data 114 stored thereon. The placement policy data 114 may include any information that the allocation agents 118a-b use in determining placement of a virtual machine or other cloud-based service. For example, the placement policy data 114 may include a listing of allocation or placement rules that the allocation agents 118a-b follow in determining where to place a virtual machine responsive to an incoming placement request. In one or more embodiments, the rules of the placement policy data 114 may include a hierarchy of rules that further corresponding allocation goals, such as optimizing allocation or resources in order to optimize a fragmentation of cloud computing resources on the computing zone 102.

While FIG. 1 illustrates an example in which placement policy data 114 is maintained within a data storage 112 on the collision avoidance system 106, in one or more embodiments, the placement policy data is expressed as a series of hard-coded rules that are part of the allocation agents 118a-b. In one or more embodiments, behavior of the allocation agents 118a-b can be controlled by changing one or more configuration settings.

As further shown in FIG. 1, the data storage 112 may include placement state data 116. The placement state data 116 may include any information related to a current state of resource allocation on the computing zone 102. For example, the placement state data 116 may include a record of current allocations that indicates which server nodes are currently occupied by virtual machines. The placement state data 116 may include information identifying any number of compute cores that are either occupied or available for allocation, and may further include an indication of fragmentation for each of the server nodes on the computing zone 102. In one or more embodiments, the placement state data 116 includes a placement store having key-value pairs representative of placement of services on corresponding server nodes for the computing zone 102. In particular, the placement state data 116 may include stored pairs of virtual machine identifiers and identifiers of server nodes (or specific cores of corresponding server nodes) that are occupied by the identified virtual machines.

While not shown in FIG. 1, in one or more embodiments, the allocation agents 118a-b may be coupled to the collision avoidance system 106 via a communication backchannel (or simply "backchannel"). In particular, the allocation agents 118a-b and collision avoidance system 106 may maintain communication. This backchannel may be used in a variety of ways.

For example, in one or more embodiments, the backchannel is used to enable the allocation agents 118a-b to communicate information about new allocations to the collision avoidance system 106 for storage within the placement store. For example, after identifying a computing resource (e.g., a server node, a set of compute cores), an allocation agent may provide an identification of the computing resource to the collision avoidance system 106 for verification against a current version of the placement store. The collision avoidance system 106 may provide a confirmation of availability or an indication that the identified computing resource has been recently allocated for placement of another virtual machine.

In one or more embodiments, the collision avoidance system 106 can provide periodic updates every few seconds or every few minutes via the backchannel to the allocation agents 118a-b to provide an updated view of the current allocation state on the computing zone 102. In this way, the collision avoidance system 106 can maintain a current record of allocation on the computing zone while providing a semi-current version of the placement state data 116 to the allocation agents 118a-b. While this may not eliminate placement conflicts for more recent placement requests, it may nonetheless reduce placement conflicts as a result of an allocation agent attempting to allocate a computing resource that was previously allocated prior to receiving the most recent placement store update.

Figure 2:
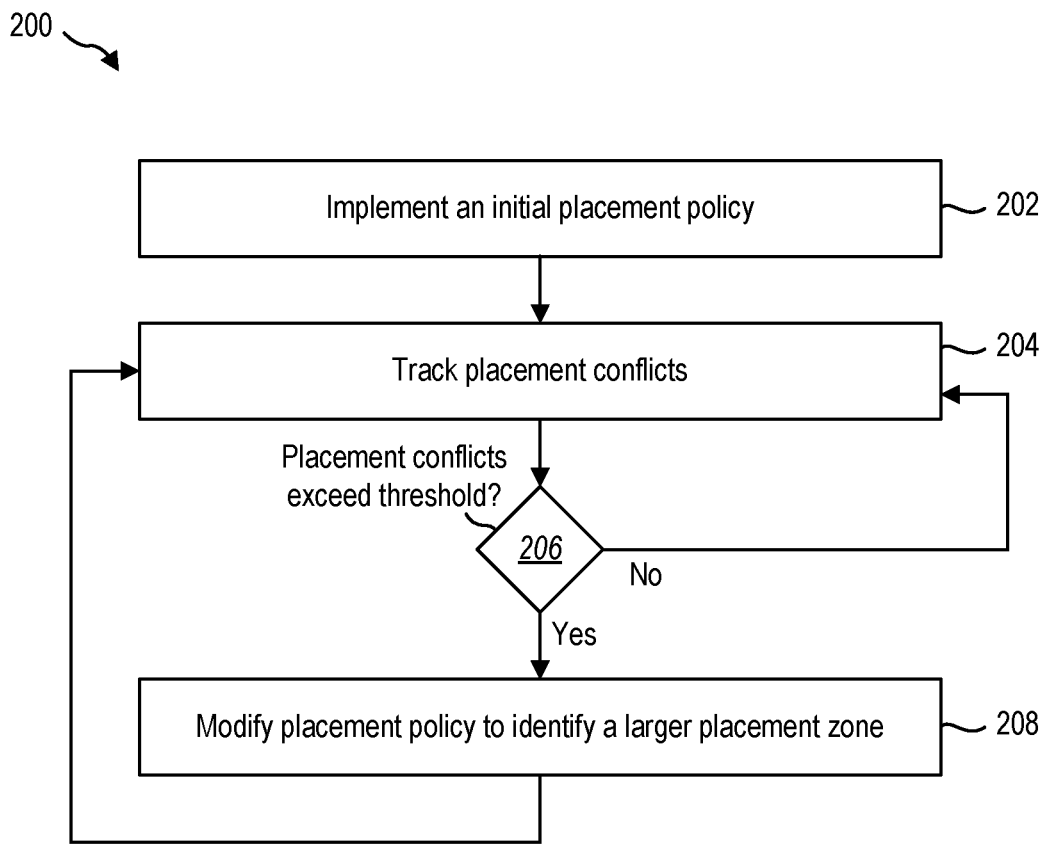
FIG. 2 illustrates an example implementation of the collision avoidance system in maintaining and updating a placement policy in accordance with one or more embodiments.
Figure 3A:
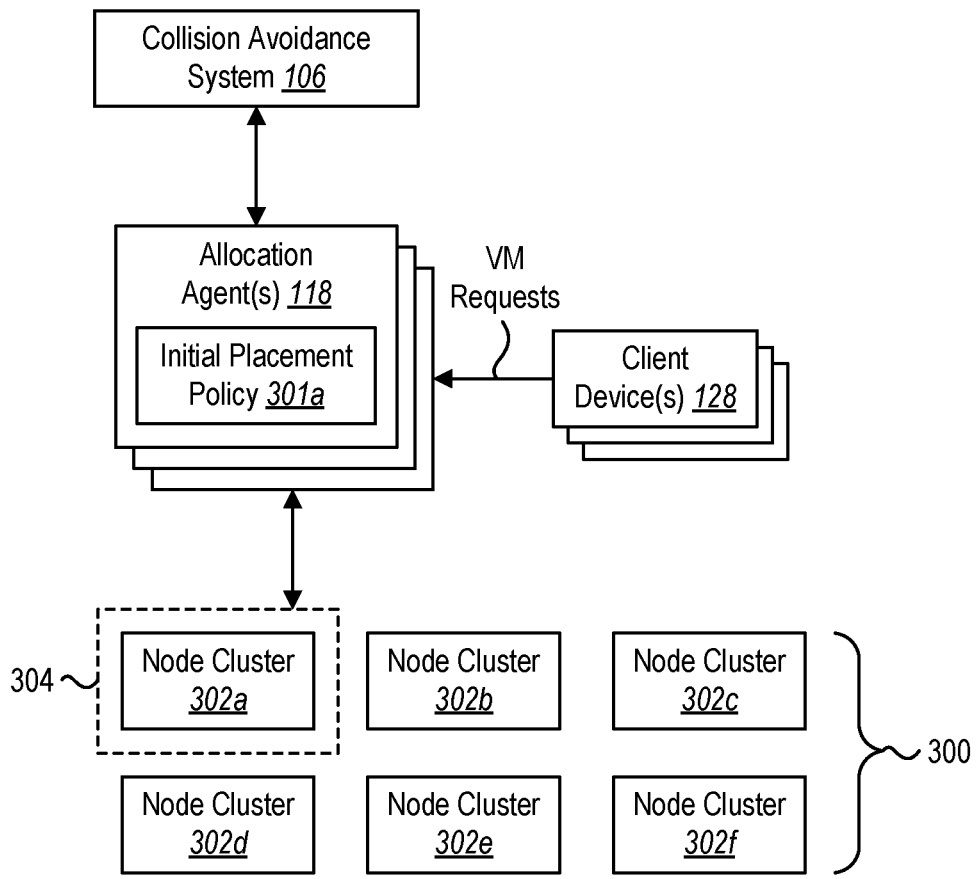
FIGS. 3A-3B illustrates an example implementation in which a placement policy is modified to accommodate a high volume of placement requests in accordance with one or more embodiments.
Figure 3B:
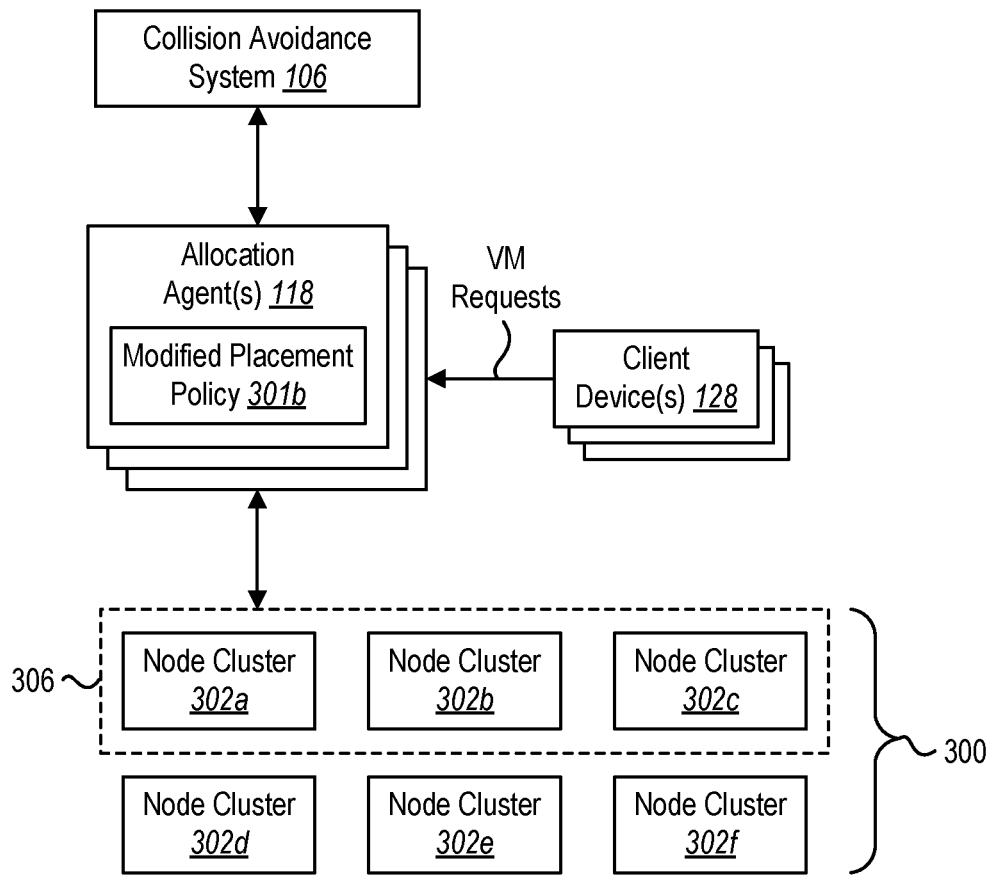

Additional information will now be discussed in connection with example implementations and workflows in connection with FIGS. 2-5B. For example, FIGS. 2-3B illustrate an example implementation of the collision avoidance system 106 in accordance with one or more embodiments described herein. In particular, FIG. 2 illustrates an example workflow showing acts that may be performed in connection with an example implementation. FIGS. 3A-3B illustrate an example visualization of the workflow shown in FIG. 2 when implemented in connection with an example plurality of node clusters.

In particular, FIG. 2 illustrates an example workflow 200 including a series of acts that may be performed by a collision avoidance system 106 in reducing placement conflicts between two or more allocation agents as a result of receiving a high number of placement requests within a short period of time. Each of the acts shown in FIG. 2 may be performed by the collision avoidance system 106 and/or by one or more allocation agents for an associated computing zone.

As shown in FIG. 2, the collision avoidance system 106 can perform an act 202 of implementing an initial placement policy. The initial placement policy may include any of the features discussed above in connection with the placement policy 120 shown in FIG. 1. In one or more embodiments, the initial placement policy includes a default placement policy to be implemented by each of multiple allocation agents on a computing zone. For example, the initial placement policy may refer to a policy in which each of a number of placement rules are considered in determining where to place a virtual machine (or other cloud-based service) on a computing zone.

In one or more embodiments, the initial placement policy refers to a most restrictive or optimistic version of the placement policy. For example, as indicated above, the initial placement policy may include instructions to consider each rule of any number of placement rules that affect placement of virtual machines on server nodes of computing zone. To illustrate, where the placement policy includes instructions to randomly allocate computing resources on a set of candidate server nodes, the initial placement policy may refer to a set of rules that identify a smaller set of candidate nodes for random allocation than other versions or potential modifications of the placement policy. As another example, where the placement policy includes a hierarchy of placement rules (e.g., ranked rules, in order of importance), the initial placement policy may include instructions to consider each of the placement rules in order of importance when determining which computing resources to allocate for placement of a virtual machine.

As further shown in FIG. 2, the collision avoidance system 106 can perform an act 204 of tracking placement conflicts. In particular, where the computing zone includes multiple allocation agents allocating computing resources in accordance with the placement policy, the collision avoidance system 106 can observe whether one or more attempts to place virtual machines results in placement conflicts between the plurality of allocation agents. As indicated above, the collision avoidance system 106 can track placement conflicts by way of a placement store that identifies server nodes and associated virtual machine identifiers (or other identifiers of services) that are deployed thereon. In particular, the collision avoidance system 106 can receive allocation information from the allocation agents and determine whether an indicated allocation attempt conflicts with a previously performed allocation by another allocation agent of the computing zone.

In addition to generally tracking placement conflicts, the collision avoidance system 106 can additionally perform an act 206 of determining whether the placement conflicts exceed a threshold. For example, the collision avoidance system 106 can determine whether a number of placement conflicts exceeds a threshold number and/or percentage of placement conflicts. In one or more embodiments, the collision avoidance system 106 determines whether the identified placement conflicts exceed the threshold over a predetermined period of time (e.g., 1-2 minutes). As shown in FIG. 2, where the placement conflicts do not exceed the threshold, the collision avoidance system 106 can perform act 204 and continue tracking placement conflicts.

Alternatively, where the collision avoidance system 106 observes that a number of recently identified placement conflicts exceeds the threshold, the collision avoidance system 106 can perform an act of modifying the placement policy to identify a larger placement zone. The collision avoidance system 106 can modify the placement policy in a number of ways. For example, in one or more implementations, the collision avoidance system 106 can modify the placement policy by decreasing, discarding, or otherwise relaxing one or more restrictions of the placement policy such that the previously applicable placement zone (e.g., the placement zone based on the initial placement policy) becomes larger.

In one or more embodiments, the collision avoidance system 106 modifies the placement policy by providing an indication of the modification to one or more of the plurality of allocation agents. In one or more implementations, the collision avoidance system 106 provides the indication of the modified placement policy to each of the plurality of allocation agents such that each of the plurality of allocation agents begins allocating computing resources across a wider range of server nodes (e.g., relative to the placement zone based on the initial placement policy).

As shown in FIG. 2, after modifying the placement policy, the collision avoidance system 106 can again perform acts 204-206 to determine whether the placement conflicts exceed the threshold. The collision avoidance system 106 can then further modify the placement policy accordingly. For example, where a number of observed conflicts continues to exceed a threshold number or percentage of placement attempts, the collision avoidance system 106 can further modify the placement policy by further relaxing one or more placement rules and/or further enlarging a placement zone on which the allocation agents can allocate resources. Alternatively, where the number of observed conflicts predictably decreases, and where that decrease in placement conflicts remains low for some predetermined period of time, the collision avoidance system 106 can modify the placement policy by reverting the modified placement policy to the initial or default placement policy.

In one or more embodiments, modifying the placement policy involves an adaptive approach based on an observed collision rate. For instance, where the collision rate is 30% or other proportional value, the collision avoidance system 106 may modify the placement policy by applying relaxed policies for a corresponding number or percentage of incoming requests. In this example, in response to the collision rate being 30%, 30% (or other proportional value) of requests will be placed using a relaxed policy while a remaining number or percentage of requests are placed using a default policy (e.g., without relaxing one or more rules). As another example, where the collision rate is 60%, 60% (or other proportional value) of requests may be placed using the relaxed policy while a remaining number or percentage of requests are placed using the default policy. Accordingly, as will be discussed in connection with one or more example implementations, the collision avoidance system 106 can modify the placement policy using a self-tuning or adaptive approach based on differing levels of observed placement conflicts.

In this example, the threshold number or percentage of placement conflicts may refer to any non-zero proportion of placement conflicts. Further, modifying the placement policy responsive to the observed placement conflicts may involve selectively modifying or relaxing the placement policy for a corresponding proportion of incoming placement requests while using a default placement policy for other incoming placement requests. Thus, in accordance with the non-limiting example, the collision avoidance system 106 may utilize a sliding scale or dynamic modification of the placement policy based on an observed proportion of placement conflicts relative to a total number of incoming placement requests. The collision avoidance system 106 may then dynamically modify the proportion of placement requests on which the relaxed placement policy is applied (e.g., selectively applied) based on a real-time collision rate of incoming placement requests.

FIGS. 3A-3B illustrate an example visualization of one implementation of the collision avoidance system 106 in accordance with one or more embodiments described herein. For example, FIG. 3A illustrates the collision avoidance system 106 in communication with a plurality of allocation agents 118. As shown in FIG. 3A, the collision avoidance system 106 may cause an initial placement policy 301a to be implemented on each of the allocation agents 118. Accordingly, in the example shown in FIG. 3A, the allocation agents 118 may receive incoming virtual machine requests (e.g., from a plurality of client devices 128). The allocation agents 118 may then allocate computing resources in accordance with the initial placement policy 301a.

As shown in FIG. 3A, the allocation agents 118 can place virtual machines on a computing zone 300 including a plurality of node clusters 302a-f. Each of the node clusters 302a-f may include any number of server nodes thereon. Moreover, one or more of the node clusters may be on one or multiple datacenters. For example, the node clusters may be located on a single regional datacenter or at different geographic locations on different datacenters.

As shown in FIG. 3A, and in accordance with the initial placement policy 301a the allocation agents 118 may selectively allocate computing resources on one of a number of server nodes within an identified placement zone 304. In this example, the allocation agents 118 may identify a placement zone 304 including the first node cluster 302a of the plurality of node clusters 302a-f. Accordingly, the allocation agents 118 may selectively allocate computing resources responsive to the incoming virtual machine requests on one or more server nodes of the first node cluster 302a.

More specifically, in this example, the allocation agents 118 may identify the placement zone 304 including the first node cluster 302a based on a determination that the first node cluster 302a meets criteria of one or more placement rules from the initial placement policy 301a. For example, the allocation agents 118 may determine that the first node cluster 302a has a threshold number of empty nodes or a level of fragmentation that would enable placement of virtual machines of a particular type on server nodes of the first node cluster 302a that would result in higher efficiency of resource utilization on the computing zone 300 than if one or more of the additional node clusters 302b-f were identified as candidate node clusters.

In accordance with one or more embodiments described herein, upon identifying the placement zone 304, the allocation agents 118 can allocate computing resources at random within the placement zone 304. For example, in response to each of the incoming virtual machine requests, the allocation agents 118 can randomly identify server nodes within the first node cluster 302a and allocate computing resources for placement of the virtual machine(s) on the randomly identified server nodes.

As discussed above in connection with FIG. 2, if the allocation agents 118 succeed in placing virtual machines responsive to the virtual machine requests without exceeding a threshold number of placement conflicts, the allocation agents 118 can continue allocating resources and placing virtual machines on the first node cluster 302a. This process may continue until the first node cluster 302a is full or no longer meets the criteria to be designated as the placement zone 304. In one or more embodiments, however, the allocation agents 118 may begin to conflict with one another as a result of receiving a high volume of virtual machine requests within a short period of time.

As indicated above, the collision avoidance system 106 can identify that the number of placement conflicts exceeds a threshold and modify the placement policy accordingly. For example, as shown in FIG. 3B, the collision avoidance system 106 can provide a modified placement policy 301b to the allocation agents 118. This modified placement policy 301b can cause the allocation agents 118 to identity an updated placement zone 306 including a larger group of node clusters. In this example, as a result of reducing one or more restrictions on the initial placement policy 301a to arrive at the modified placement policy 301b, the allocation agents 118 can identify a new placement zone 306 including the first node cluster 302a, second node cluster 302b, and the third node cluster 302c.

While FIG. 3B illustrates an example in which the size of the placement zone increases three-fold (e.g., from one to three node clusters), the placement zone may increase by any number of server nodes. For example, the placement zone may increase by fewer server nodes (e.g., some or all of a node cluster) or more than shown in FIG. 3B. In addition, in one or more embodiments, the change in size of the placement zone may be based on a measure of placement conflicts relative to the threshold. For example, where the collision avoidance system 106 identifies significantly more placement conflicts than the threshold (e.g., as a result of a massive influx of placement requests), the placement zone may be enlarged by more server nodes than where the collision avoidance system 106 determines that the number of placement conflicts exceeds the threshold by a smaller amount (e.g., a lower percent).

Alternatively, as discussed above in connection with FIG. 2, the placement zone may be incrementally modified until a number of placement conflicts no longer exceeds the threshold. For example, the collision avoidance system 106 may modify the initial placement policy 301a multiple times in arriving at the modified placement policy 301b by incrementally relaxing one or multiple placement rules from the original placement policy. In this example, the placement zone may increase by an incremental number of server nodes, such as increasing the size of the placement zone by a single node cluster to arrive at the placement zone 306 of three node clusters shown in FIG. 3B. Alternatively, the placement zone may incrementally increase by some fixed number of server nodes and/or percentage of server nodes relative to a size of the initial placement zone 304.

In each of the above examples, the allocation agents 118 may randomly allocate computing resources from the identified placement zone. For example, upon identifying the modified placement zone 306 shown in FIG. 3B, the allocation agents 118 may randomly allocate computing resources and place virtual machines at random server nodes from any of the three node clusters 302a-c based on the modified placement policy 301b. While the placement zone 306 includes the greater number of node clusters 302a-c, the allocation agents 118 may experience fewer placement conflicts as a result of a larger number of server nodes on which the computing resources can be randomly allocated.

Figure 4:
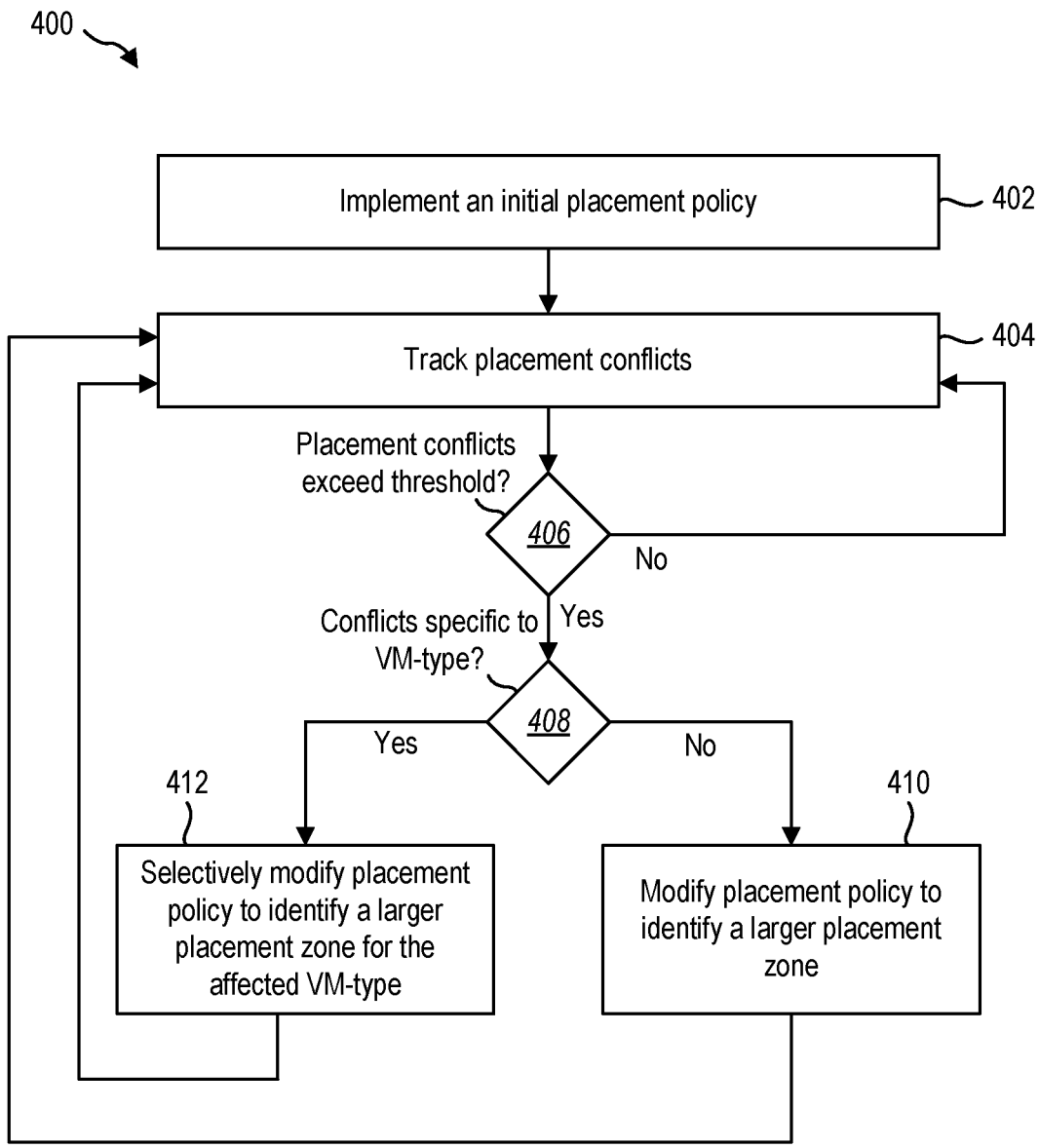
FIG. 4 illustrates an example implementation of the collision avoidance system in selectively modifying a placement policy in accordance with one or more embodiments.
Figure 5A:
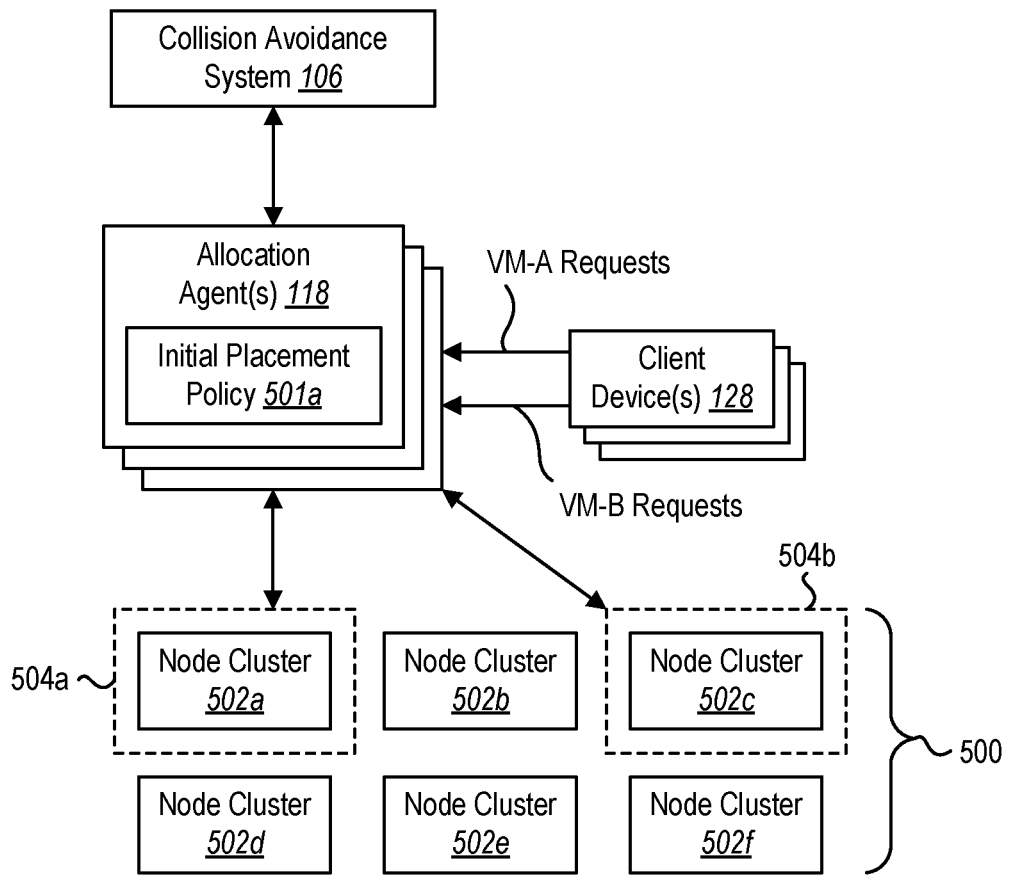
FIGS. 5A-5B illustrates an example implementation in which a placement policy is selectively modified to accommodate a high volume of placement requests in accordance with one or more embodiments.
Figure 5B:
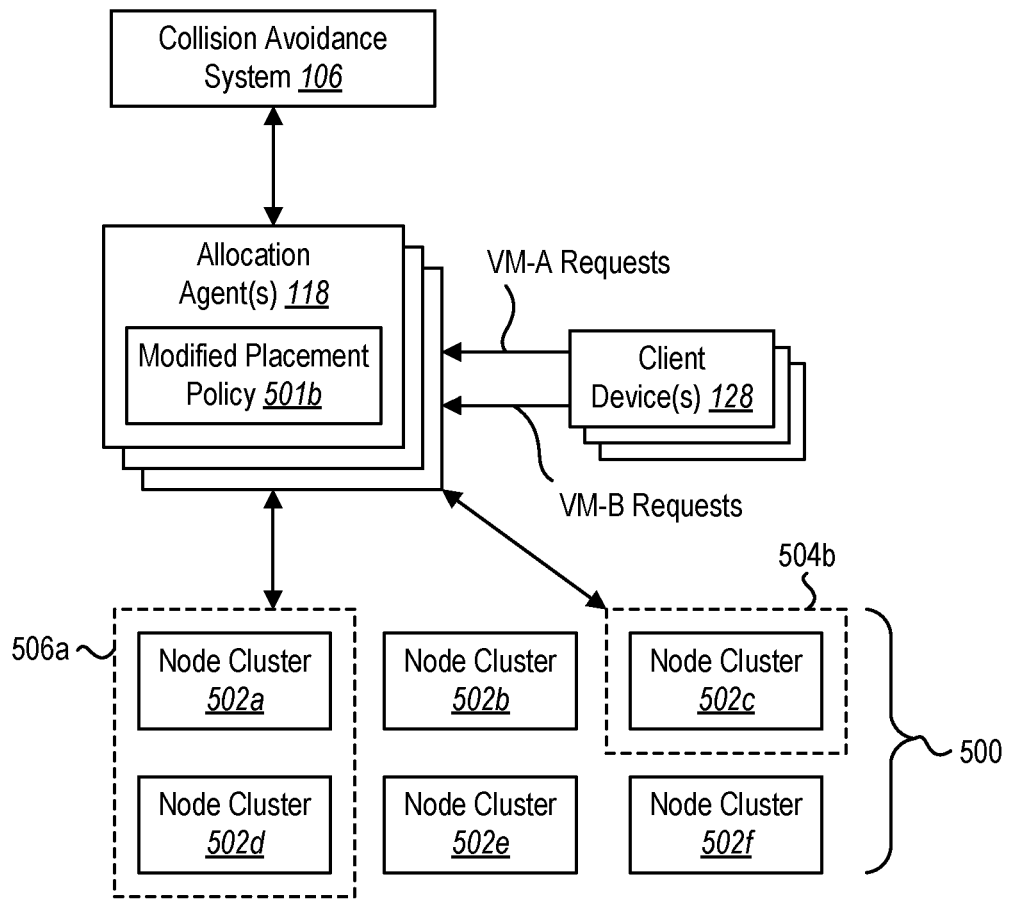

FIGS. 4-5B illustrate another example implementation in which the collision avoidance system 106 and a plurality of allocation agents 118 may cooperatively reduce instances of placement conflicts on server nodes of a computing zone. In particular, FIG. 4 illustrates an example workflow 400 showing a series of acts that may be performed by a collision avoidance system 106 in reducing placement conflicts between allocation agents. One or more of the acts shown in FIG. 4 may be performed by the collision avoidance system 106 and/or by one or more allocation agents for an associated computing zone.

As shown in FIG. 4, the workflow 400 includes several acts that are similar to those discussed above in connection with FIG. 2. For example, acts 402-406 may include similar features and functionality as corresponding acts 202-206 discussed above in connection with implementing an initial placement policy, tracking placement conflicts, and determining whether a number of observed placement conflicts are greater than or equal to a threshold (e.g., threshold number of percentage) within a predetermined time period.

In this example, as well as in other embodiments, the placement policy may include different rules or instructions that are applicable for placement of different types of virtual machines (or other cloud-based services). For example, a first type of virtual machine associated with a first set of characteristics may be associated with a different placement zone or different set of placement rules than a second type of virtual machine associated with a second set of characteristics. Indeed, the different characteristics of the virtual machines may cause the virtual machines to be better suited for placement on different clusters than one another. This may be a result of different characteristics of the servers themselves, different sizes of the virtual machines, differences in the applications of the virtual machines, or other factors.

Thus, as shown in FIG. 4 in addition to determining whether the placement conflicts exceed a threshold generally, the collision avoidance system 106 may perform an act 408 of determining whether the identified placement conflicts are specific to a particular machine-type. For example, the collision avoidance system 106 may determine that the identified placement conflicts are occurring for placements of a first type of virtual machine while placement requests for a second type of virtual machine are not causing any placement conflicts (or at least less than a threshold number).

The collision avoidance system 106 may then selectively modify the placement policy based on the determination of whether the placement conflicts are localized to a specific type of virtual machine. For example, where the collision avoidance system 106 determines that the placement conflicts are not unique to a specific virtual machine, the collision avoidance system 106 may perform act 410 of modifying the placement policy to identify a larger placement zone. This act 410 may include similar features as corresponding act 208 discussed above in connection with FIG. 2.

Alternatively, where the collision avoidance system 106 determines that the placement conflict is unique to a specific virtual machine type, the collision avoidance system 106 can perform an act 412 of selectively modifying the placement policy for the specific virtual machine type. In particular, similar to one or more embodiments described herein, the collision avoidance system 106 can selectively modify the placement policy to identify a larger placement zone for the virtual machine-type that is experiencing placement conflicts at a higher rate.

In either case (e.g., whether the collision avoidance system 106 determines that the placement conflicts are specific to a virtual machine type), the collision avoidance system 106 can return to act 404 and continue tracking placement conflicts between allocation agents of the computing zone. Further, the collision avoidance system 106 can continue modifying or reverting the placement policy or portions of the placement policy applicable to different virtual machine types based on observed changes in the rate at which placement conflicts occur on the computing zone.

Moving on, FIGS. 5A-5B illustrates an example visualization of one implementation of the collision avoidance system 106 in accordance with one or more embodiments described herein. Similar to the examples discussed above in connection with FIGS. 3A-3B, FIG. 5A shows the collision avoidance system 106 in communication with a plurality of allocation agents 118. Similar to FIG. 3A, the collision avoidance system 106 can cause an initial placement policy 501*a* to be implemented on each of the allocation agents 118. Similarly, the allocation agents 118 may receive virtual machine placement requests from the plurality of client devices 128. As shown in FIG. 5A, the placement requests may include a first set of placement requests associated with a first type of virtual machine (denoted as VM-A requests) and a second type of virtual machine (denoted as VM-B requests).

As shown in FIG. 5A, the allocation agents 118 can place virtual machines on a computing zone 500 including a plurality of node clusters 502*a-f*. Each of the node clusters 502*a-f* may include similar features as other node clusters discussed herein.

In accordance with the initial placement policy 501*a*, the allocation agents 118 can selectively allocate computing resources on the server nodes based on the identified placement zones 504*a-b*. In this example, the allocation agents 118 may allocate resources for a first type of virtual machines (e.g., responsive to the first set of placement requests) on server nodes of the first placement zone 504*a*. Similarly, the allocation agents 118 may allocate resources for a second type of virtual machines (e.g., responsive to the second set of placement requests) on server nodes of the second placement zone 504*b*. In this example, the first placement zone 504*a* includes a first node cluster 502*a* while the second placement zone 504*b* includes a third node cluster 502*c*. The placement zones may include overlapping server nodes shared between the placement zones. Alternatively, the placement zones may include non-overlapping groupings of server nodes as shown in FIG. 5A. \

The allocation agents 118 can allocate resources within the respective zones in accordance with the initial placement policy 501*a*. For example, the allocation agents 118 can randomly select server nodes within the respective placement zones 504*a-b* similar to one or more embodiments described herein.

Based on an observed number of placement conflicts by the collision avoidance system 106, the placement policy may be modified by reducing one or more restrictions in how the allocation agents 118 have been instructed to allocate computing resources. In one or more embodiments, the initial placement policy 501*a* is modified similarly to one or more examples discussed above. In this example, the initial placement policy 501*a* may be selectively modified with respect to rules associated with a particular type of virtual machine.

In particular, as shown in FIG. 5B, the collision avoidance system 106 can selectively relax one or more placement rules associated with placement of a first type of virtual machine associated with the first placement zone 504*a*. In particular, where the collision avoidance system 106 determines that placement conflicts are occurring at a higher frequency with respect to virtual machines of a first type (e.g., associated with the first set of placement requests), the collision avoidance system 106 can selectively modify rules associated with placement of the first virtual machine type. This may be performed without modifying rules associated with placement of a second virtual machine type.

As shown in FIG. 5B, the collision avoidance system 106 may implement a modified placement policy 501*b* on the allocation agents 118. As further shown, the modified placement policy 501*b* may include one or more relaxed placement rules resulting in a first modified placement zone 506*a* associated with the first virtual machine type and the original placement zone 504*b* associated with the second virtual machine type. As shown in FIG. 5B, the updated first placement zone 506*a* includes the first node cluster 502*a* and a fourth node cluster 502*b* while the second placement zone 504*b* again includes the third node cluster 502*c*.

Figure 6:
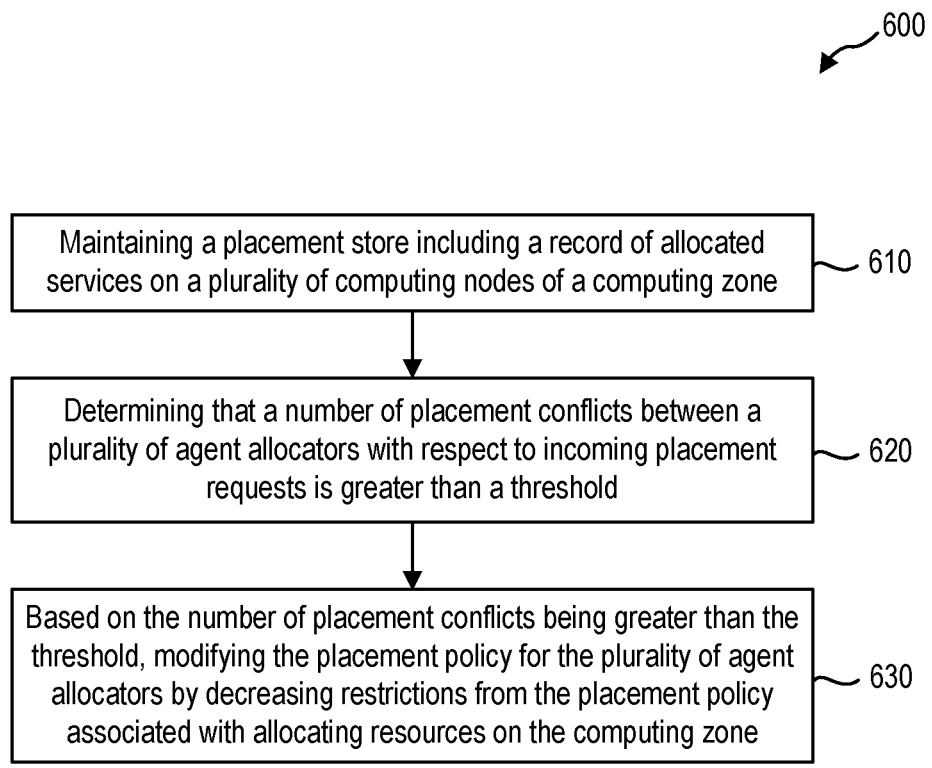
FIG. 6 illustrates an example series of acts for modifying and implementing a placement policy to reduce allocation conflicts in accordance with one or more embodiments.

Turning now to FIG. 6, this figure illustrates an example flowchart including a series of acts for reducing placement conflicts between allocation agents in placing cloud-based services on a computing zone. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device (e.g., a server device) to perform the acts of FIG. 6. In still further embodiments, a system can perform the acts of FIG. 6.

FIG. 6 illustrates an example series of acts 600 for reducing placement conflicts between allocation agents. For example, the series of acts 600 includes an act 610 of maintaining a placement store including a record of allocated services on a plurality of computing nodes of a computing zone. In one or more embodiments, the act 610 involves maintaining a placement store including a record of allocated computing resources on a plurality of computing nodes of a computing zone where the computing zone includes a plurality of agent allocators for allocating resources in response to incoming placement requests in accordance with a placement policy. In one or more embodiments, maintaining the placement store includes storing pairings of service identifiers and node identifiers indicating a placement of one or more services on corresponding computing nodes of the computing zone.

As further shown, the series of acts 600 includes an act 620 of determining that a number of placement conflicts between a plurality of agent allocators with respect to incoming placement requests is greater than a threshold. For example, the act 620 may include determining, based on information from the record of allocated computing resources, that a number of placement conflicts between the plurality of agent allocators with respect to incoming placement requests is greater than or equal to a threshold number of placement conflicts for a predetermined period of time.

In one or more embodiments, the series of acts 600 includes identifying the placement conflicts based on detected conflicts between attempted placement of services by one or more of the plurality of agent allocators and previously placed services indicated within the record of allocated computing resources. Moreover, in one or more embodiments, determining that the number of placement conflicts is greater than or equal to the threshold number of placement conflicts includes detecting a threshold percentage of commit failures for incoming placement requests by the plurality of agent allocators.

As further shown, the series of acts 600 includes an act 630 of modifying, based on the number of placement conflicts being greater than the threshold, the placement policy for the plurality of agent allocators by decreasing restrictions from the placement policy associated with allocating resources on the computing zone. For example, the act 630 may include based on determining that the number of placement conflicts is greater than or equal to the threshold number of placement conflicts, modifying the placement policy for the plurality of agent allocators by decreasing one or more restrictions from the placement policy associated with allocating resources on the plurality of computing nodes of the computing zone.

In one or more embodiments, the placement policy includes a set of rules executable by the plurality of agent allocators to identify candidate nodes for resource allocation by identifying a subset of computing nodes from the plurality of computing nodes of the computing zone and randomly allocate resources for the incoming placement requests on the identified candidate nodes. In one or more embodiments, modifying the placement policy includes modifying the set of rules to cause the plurality of agent allocators to expand the candidate nodes to include the subset of computing nodes and additional computing nodes from the plurality of computing nodes of the computing zone. In one or more embodiments, modifying the set of rules includes discounting one or more rules from the set of rules to expand the candidate nodes eligible for resource allocation.

In one or more embodiments, the series of acts 600 includes identifying, from the incoming placement requests, a first set of placement requests for a first type of resource and a second set of placement requests for a second type of resource. The series of acts 600 further include determining that the number of placement conflicts being greater than or equal to the threshold number of placement conflicts are associated with the first set of placement requests. In one or more implementations, modifying the placement policy includes selectively decreasing one or more restrictions from the placement policy for the first set of placement requests without decreasing one or more restrictions from the placement policy for the second set of placement requests.

In one or more embodiments, the series of acts 600 includes determining that an updated number of placement conflicts between the plurality of agent allocators continues to be greater than or equal to the threshold number of placement conflicts under the modified placement policy. In one or more implementations, the series of acts 600 includes based on determining that the updated number of placement conflicts continues to be greater than or equal to the threshold number of placement conflicts, further modifying the placement policy by decreasing one or more additional restrictions from the placement policy.

In one or more embodiments, the series of acts 600 includes determining that an updated number of placement conflicts between the plurality of agent allocators has decreased by a threshold amount under the modified placement policy. The series of acts 600 may further include, based on determining that the updated number of placement conflicts has decreased by the threshold amount, causing the plurality of agent allocators to revert back to the placement policy.

Figure 7:
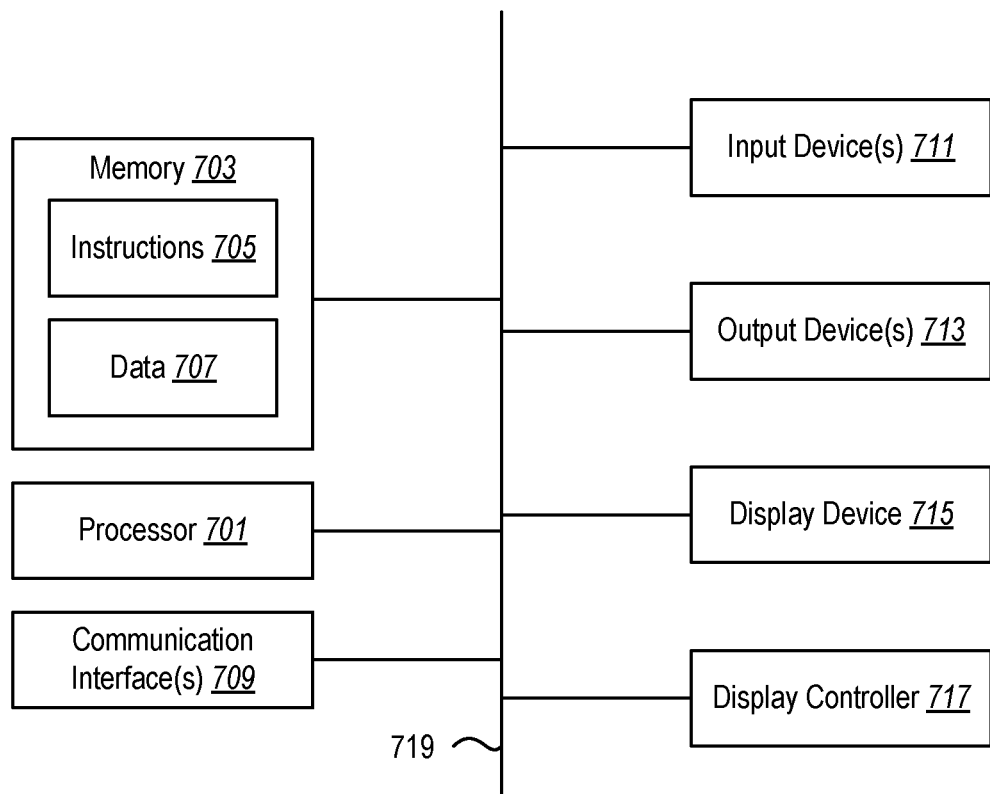
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    maintaining a placement store including a record of allocated computing resources on a plurality of computing nodes of a computing zone, the computing zone including a plurality of agent allocators configured to concurrently allocated resources in response to incoming placement requests in accordance with a placement policy applicable to each agent allocator of the plurality of agent allocators;
    determining, based on information from the record of allocated computing resources, that a number of placement conflicts between the plurality of agent allocators with respect to incoming placement requests is greater than or equal to a threshold number of placement conflicts for a predetermined period of time;
    based on determining that the number of placement conflicts is greater than or equal to the threshold number of placement conflicts, modifying the placement policy applicable to each agent allocator of the plurality of agent allocators by decreasing one or more restrictions from the placement policy associated with allocating resources on the plurality of computing nodes of the computing zone; and
    causing the plurality of agent allocators to allocate resources on the plurality of computing nodes in accordance with the modified placement policy applicable to each agent allocator of the plurality of agent allocators.

2. The method of claim 1, wherein maintaining the placement store comprises storing pairings of service identifiers and node identifiers indicating a placement of one or more services on corresponding computing nodes of the computing zone.

3. The method of claim 1, further comprising identifying the placement conflicts based on detected conflicts between attempted placement of services by one or more of the plurality of agent allocators and previously placed services indicated within the record of allocated computing resources.

4. The method of claim 1, wherein determining that the number of placement conflicts is greater than or equal to the threshold number of placement conflicts comprises detecting a threshold percentage of commit failures for incoming placement requests by the plurality of agent allocators.

5. The method of claim 1, wherein the placement policy includes a set of rules executable by each agent allocator of the plurality of agent allocators to:
    identify candidate nodes for resource allocation by identifying a subset of computing nodes from the plurality of computing nodes of the computing zone; and
    randomly allocate resources for the incoming placement requests on the identified candidate nodes.

6. The method of claim 5, wherein modifying the placement policy comprises modifying the set of rules to cause the plurality of agent allocators to expand the candidate nodes to include the subset of computing nodes and additional computing nodes from the plurality of computing nodes of the computing zone.

7. The method of claim 6, wherein modifying the set of rules comprises discounting one or more rules from the set of rules to expand the candidate nodes eligible for resource allocation.

8. The method of claim 1, further comprising:
    identifying, from the incoming placement requests, a first set of placement requests for a first type of resource and a second set of placement requests for a second type of resource; and
    determining that the number of placement conflicts being greater than or equal to the threshold number of placement conflicts are associated with the first set of placement requests, wherein modifying the placement policy comprises selectively decreasing one or more restrictions from the placement policy for the first set of placement requests without decreasing one or more restrictions from the placement policy for the second set of placement requests.

9. The method of claim 1, further comprising:
determining that an updated number of placement conflicts between the plurality of agent allocators continues to be greater than or equal to the threshold number of placement conflicts under the modified placement policy; and
based on determining that the updated number of placement conflicts continues to be greater than or equal to the threshold number of placement conflicts, further modifying the placement policy by decreasing one or more additional restrictions from the placement policy.

10. The method of claim 1, further comprising:
determining that an updated number of placement conflicts between the plurality of agent allocators has decreased by a threshold amount under the modified placement policy; and
based on determining that the updated number of placement conflicts has decreased by the threshold amount, causing the plurality of agent allocators to revert back to the placement policy.

11. The method of claim 1, wherein causing the plurality of agent allocators to allocate resources comprising causing each agent allocator of the plurality of agent allocators to concurrently process placement requests and allocate resources on the plurality of computing nodes of the computing zone in accordance with the modified placement policy.

12. A system, comprising:
one or more processors;
memory in electronic communication with the one or more processors;
instructions stored in the memory, the instructions being executable by the one or more processors to:
maintain a placement store including a record of allocated computing resources on a plurality of computing nodes of a computing zone, the computing zone including a plurality of agent allocators configured to concurrently allocate resources in response to incoming placement requests in accordance with a placement policy applicable to each agent allocator of the plurality of agent allocators;
determine, based on information from the record of allocated computing resources, that a number of placement conflicts between the plurality of agent allocators with respect to incoming placement requests is greater than or equal to a threshold number of placement conflicts for a predetermined period of time;
based on determining that the number of placement conflicts is greater than or equal to the threshold number of placement conflicts, modify the placement policy applicable to each agent allocator of the plurality of agent allocators by decreasing one or more restrictions from the placement policy associated with allocating resources on the plurality of computing nodes of the computing zone; and
cause the plurality of agent allocators to allocate resources on the plurality of computing nodes in accordance with the modified placement policy applicable to each agent allocator of the plurality of agent allocators.

13. The system of claim 12, wherein the placement policy includes a set of rules executable by the plurality of agent allocators to:
identify candidate nodes for resource allocation by identifying a subset of computing nodes from the plurality of computing nodes of the computing zone; and
randomly allocate resources for the incoming placement requests on the identified candidate nodes.

14. The system of claim 13,
wherein modifying the placement policy comprises modifying the set of rules to cause each agent allocator of the plurality of agent allocators to expand the candidate nodes to include the subset of computing nodes and additional computing nodes from the plurality of computing nodes of the computing zone, and
wherein modifying the set of rules comprises discounting one or more rules from the set of rules to expand the candidate nodes eligible for resource allocation.

15. The system of claim 12, further comprising instructions being executable by the one or more processors to:
identify, from the incoming placement requests, a first set of placement requests for a first type of resource and a second set of placement requests for a second type of resource; and
determine that the number of placement conflicts being greater than or equal to the threshold number of placement conflicts are associated with the first set of placement requests,
wherein modifying the placement policy comprises selectively decreasing one or more restrictions from the placement policy for the first set of placement requests without decreasing one or more restrictions from the placement policy for the second set of placement requests.

16. The system of claim 12, wherein causing the plurality of agent allocators to allocate resources comprises causing each agent allocator of the plurality of agent allocators to concurrently process placement requests and allocate resources on the plurality of computing nodes of the computing zone in accordance with the modified placement policy.

17. A non-transitory computer readable medium storing instructions thereon that, when executed by at least one processor, causes the at least one processor to:
maintain a placement store including a record of allocated computing resources on a plurality of computing nodes of a computing zone, the computing zone including a plurality of agent allocators configured to concurrently allocate resources in response to incoming placement requests in accordance with a placement policy applicable to each agent allocator of the plurality of agent allocators;
determine, based on information from the record of allocated computing resources, that a number of placement conflicts between the plurality of agent allocators with respect to incoming placement requests is greater than or equal to a threshold number of placement conflicts for a predetermined period of time; and
based on determining that the number of placement conflicts is greater than or equal to the threshold number of placement conflicts, modify the placement policy applicable to each agent allocator of the plurality of agent allocators by decreasing one or more restrictions from the placement policy associated with allocating resources on the plurality of computing nodes of the computing zone; and cause the plurality of agent allocators to allocate resources on the plurality of computing nodes in accordance with the modified placement policy applicable to each agent allocator of the plurality of agent allocators.

18. The non-transitory computer readable medium of claim 17, wherein maintaining the placement store comprises storing pairings of service identifiers and node identifiers indicating a placement of one or more services on corresponding computing nodes of the computing zone.

19. The non-transitory computer readable medium of claim 17, wherein the placement policy includes a set of rules executable by the plurality of agent allocators to:
   identify candidate nodes for resource allocation by identifying a subset of computing nodes from the plurality of computing nodes of the computing zone; and
   randomly allocate resources for the incoming placement requests on the identified candidate nodes.

20. The non-transitory computer readable medium of claim 19,
   wherein modifying the placement policy comprises modifying the set of rules to cause the plurality of agent allocators to expand the candidate nodes to include the subset of computing nodes and additional computing nodes from the plurality of computing nodes of the computing zone; and
   wherein modifying the set of rules comprises discounting one or more rules from the set of rules to expand the candidate nodes eligible for resource allocation.

* * * * *